United States Patent
Kynast et al.

(10) Patent No.: US 6,823,354 B1
(45) Date of Patent: Nov. 23, 2004

(54) METHOD FOR A TERMINAL USING SERVICES OFFERED BY A MASTER STATION AND A TERMINAL

(75) Inventors: Andreas Kynast, Hildesheim (DE); Ulrich Kersken, Diekholzen (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/554,368

(22) PCT Filed: Nov. 6, 1998

(86) PCT No.: PCT/DE98/03236

§ 371 (c)(1),
(2), (4) Date: Jul. 7, 2000

(87) PCT Pub. No.: WO99/26442

PCT Pub. Date: May 27, 1999

(30) Foreign Application Priority Data

Nov. 14, 1997 (DE) .......................... 197 50 366

(51) Int. Cl.$^7$ .............................. G06F 15/16
(52) U.S. Cl. ................ 709/200; 709/202; 709/246; 709/249; 370/259; 455/445
(58) Field of Search ................ 709/200, 202, 709/246, 249; 370/259; 455/445

(56) References Cited

U.S. PATENT DOCUMENTS

| | | | | |
|---|---|---|---|---|
| 5,046,082 A | | 9/1991 | Zicker et al. | |
| 5,727,159 A | * | 3/1998 | Kikinis | 709/246 |
| 5,812,533 A | * | 9/1998 | Cox et al. | 370/259 |
| 5,982,324 A | * | 11/1999 | Watters et al. | 342/357.06 |
| 6,069,944 A | * | 5/2000 | Cretch | 379/201.12 |
| 6,522,883 B2 | * | 2/2003 | Titmuss et al. | 455/445 |

FOREIGN PATENT DOCUMENTS

| | | |
|---|---|---|
| EP | 0 706 295 | 4/1996 |
| GB | 2 308 039 | 6/1997 |

\* cited by examiner

Primary Examiner—John Follansbee
Assistant Examiner—Jinsong Hu
(74) Attorney, Agent, or Firm—Kenyon & Kenyon

(57) ABSTRACT

A terminal and a method for a terminal using services offered by a master station is proposed. The method allows a user-configured service to be activated at a terminal which is limited in its input possibility. In this context, a first terminal transmits activation data to the master station over a first data network. With the assistance of the activation data, a service identification and a terminal identifier are transmitted to the master station. In the master station, a service is selected as a function of the service identification. The master station transmits service data corresponding to the selected service as a function of the terminal identifier so that the service data is recognized by the first terminal upon reception and initiates functions for implementing the selected service at the first terminal.

27 Claims, 4 Drawing Sheets

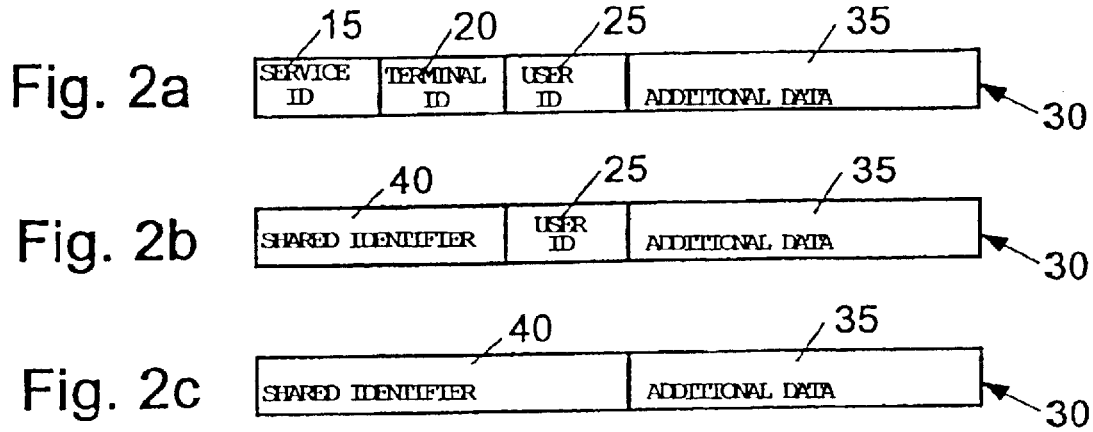
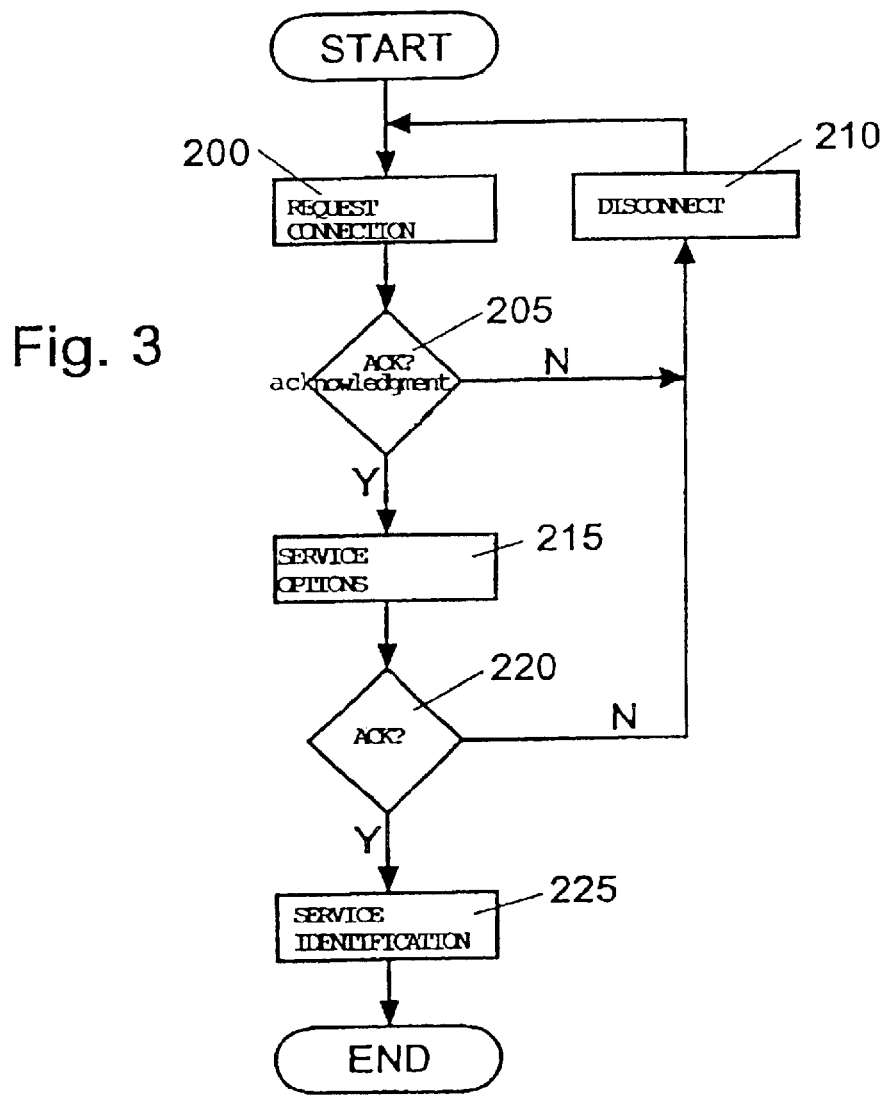

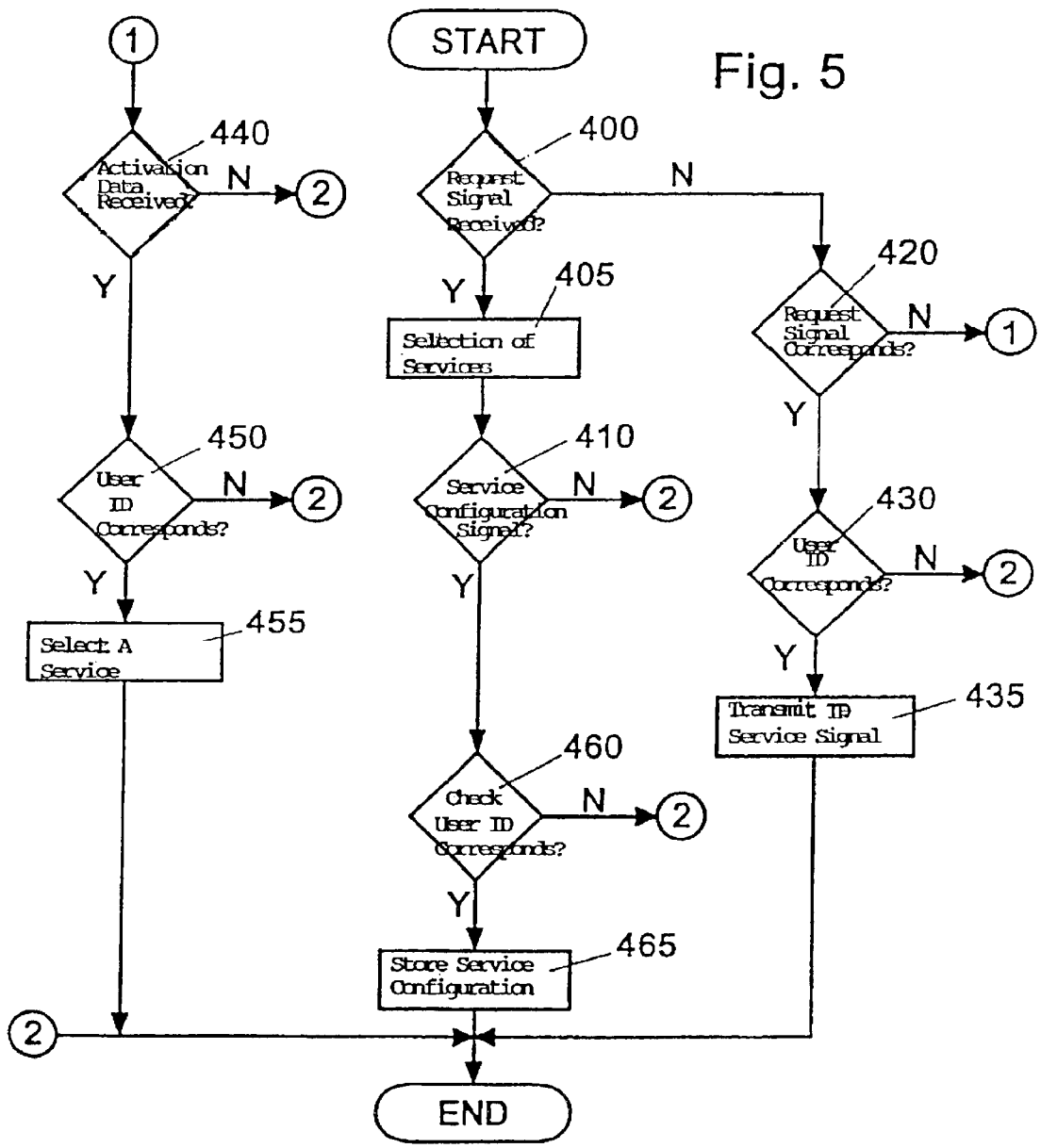

METHOD FOR A TERMINAL USING SERVICES OFFERED BY A MASTER STATION AND A TERMINAL

FIELD OF THE INVENTION

The present invention relates to a method for a terminal using services offered by a master station, and a terminal.

BACKGROUND INFORMATION

A method by which a terminal uses services that are offered by a master station, for example, in the form of telephone banking, is conventional.

Also terminals designed as mobile radio units including a control unit and a transmitting/receiving device for transmitting and receiving data over a data network are conventional.

SUMMARY OF THE INVENTION

The method and terminal according to the present invention have the advantage that very complex services can be used by terminals that have only limited input possibilities. In this context, for using such a complex service, it is only required for a service identification allocated to the service to be selected to be input at a control unit of the terminal. In this context, such an input of a service identification can be carried out most easily using a ten-key pad of the terminal.

A further advantage exists when a terminal according to the present invention is used in a vehicle since the driver must only input the service identification for activating the service he desires at the control unit of the terminal and, therefore, is not significantly impaired in his attention to the traffic so that traffic safety during the operation of such a terminal is increased.

A further advantage is that, because of merely inputting the service identification at the control unit of the terminal for activating the appertaining desired service, no information or parameters on the service to be activated must be stored in the terminal so that memory space is saved in the terminal. The terminal can be implemented independently of the services offered by the master station since the service data generated by the master station is adapted to the possibilities and the scope of functionality of the terminal requesting the corresponding service. In this manner, no additional outlay is required in the terminal for implementing the method according to the present invention so that conventional terminals can be used and no additional manufacturing effort or outlay of material or space exists for the terminal.

It is an advantage that a user identification is transmitted to the master station by the activation data, and that the master station transmits the service data to a first terminal only if the user identification matches user data stored in the master station. In this manner, a check of the access authorization for the services offered by the master station is made possible in a simple manner. In this context, the access authorization can be checked very quickly, as well, since the user identification is transmitted to the master station with the activation data.

It is also beneficial for the first terminal to transmit a request signal including the terminal identifier and/or the user identification to the master station over a first data network, and for the master station to transmit a service-identification signal to the first terminal over the first data network as a function of a received request signal. The service-identification signal includes service identifications of the services of the master station which are usable by the first terminal. In this manner, the user gets an overview of the usable services of the master station and their service identifications, which the user can also store in the terminal for subsequent selection processes, if desired, so that the clarity and the operating convenience of the terminal are enhanced. Because the master station provides the user with the service identifications of the services which can be used by the terminal, and, possibly, by storing these service identifications in the terminal, the user no longer has to memorize the services that can be used by his terminal.

It is a further advantage that, with the assistance of the activation data, additional data on the condition and/or on the location of the first terminal are transmitted to the master station, and the service data is generated by the master station as a function of the additional data so that the condition and/or the location of the first terminal are provided for during the implementation of the selected service at the first terminal. In this manner, a part of the data necessary for configuring a service can be generated by the terminal automatically and routed to the master station. Thereby, condition- and/or location-dependent data of the terminal can be provided for during the activation of a correspondingly desired service.

Moreover, it is advantageous for the service identification, the terminal identifier and/or the user identification to be combined into one shared identifier. In this manner, the selection of a desired service and the generation of the service data which is adapted to the possibilities and the scope of functionality of the terminal can be simplified and combined into only one process in the master station in a time-saving manner.

It is also advantageous that service-configuration data having parameters for adjusting a service, which is usable by the first terminal and offered by the master station is transmitted to the master station, by a second terminal over a second data network; the terminal identifier and/or the user identification of the first terminal is transmitted to the master station; service data is derived from the service-configuration data and stored in the master station with the terminal identifier and/or the user identification; and a service identification is allocated to the service data, stored in the master station with the service data, and transmitted to the second terminal over the second data network. In this manner, user-configured services can be activated at a first terminal that has a limited input possibility by inputting the appertaining service identification at the control unit in a simple manner without having to configure these services at the first terminal beforehand. Instead, such services can be configured using a second terminal which is not limited in its input possibility; the service itself, however, can be used at the first terminals which is limited in its input possibility. In this manner, the functionality of the first terminal is enhanced without requiring any additional outlay during the manufacture of the first terminal.

A further advantage occurs when the first terminal is used in a vehicle. In this context, the driver can configure a service in the master station prior to driving the vehicle via the second terminal and activate this service during the drive simply by inputting the service identification at the first terminal. A complex user configuration during the drive is eliminated, and a first terminal, which is limited in its input possibility, can be carried in the vehicle for activating and using this service. Therefore, the attention of the driver is not taken up with configuring the service during the drive, and the limited spatial conditions in the vehicle are provided for by using the space-saving first terminal with limited input possibilities.

Moreover, it is advantageous that information on output possibilities of the first terminal and/or on predefinable output possibilities are transmitted with the service-configuration data. In this manner, the service data can be adapted to the output possibilities and/or to the output preferences of the user in the form of different predefinable output modes of, for example, voice output or data display on a display of the first terminal, in response to the selection of a corresponding service by the first terminal.

It is also advantageous to use a common data network for the first and the second data network. In this manner, a high flexibility in the utilization of data networks for transmitting the service-configuration data, the service data, the activation data, and the request signal is possible. Besides, the method according to the present invention can be implemented with the lowest possible need of data networks, as well.

A further advantage is that, with the assistance of the service data transmitted to the first terminal, the traffic situation from the current location of the first terminal to the destination is monitored at the first terminal as a function of a destination selected at the second terminal and transmitted to the master station with the service-configuration data and a function of a current location of the first terminal transmitted to the master station by the first terminal with the additional data. In this manner, especially when using the first terminal in a vehicle, a traffic situation can be monitored in a simple manner, requiring a minimum of attention from the user or driver while a maximum of traffic information is received by the first terminal.

It is also advantageous to have a terminal at whose control unit at least one text is inputtable, foe example via an alphanumeric keyboard, where the at least one text can be allocated to a service identification, and where the at least one text can be stored in the memory and outputted at an output unit subsequent to selecting an operating mode in which a service identification can be input at the control unit. In this manner, the service identifications can be better identified by the user, thus allowing the user to select and activate a service at the terminal in a manner that is faster and requires less attention, and, particularly when arranging the terminal in a vehicle, does not result in a significant impairment of traffic safety during the drive because of the negligible distraction of the driver during the corresponding control of the terminal for activating the desired service.

A further advantage is that all texts stored in the memory can be outputted at the output unit during the operating mode; that one of the outputtable texts can be selected at the control unit; and, subsequent to the selection of a text, the transmitting/receiving unit sends off activation data including a service identification allocated to the selected text. In this manner, the clarity during the selection of a service at the terminal is increased for the user, thus permitting a faster selection and less distraction of the user, which, particularly in road traffic, has a positive effect on traffic safety.

It is also advantageous for the control unit to be provided with at least one key, which a service identification can be allocated to, and the transmitting/receiving unit to send activation data including the allocated service identification subsequent to the actuation of the at least one key. In this manner, the service identifications can be allocated to the keys of the terminal, for example, to the preset station buttons of a car radio with integrated telephone. The allocation of specific service identifications to such keys makes it easier to select, above all, very frequently used services.

BRIEF DESCRIPTION OF THE DRAWINGS

FIG. 2*a* shows a first embodiment of an activation signal.

FIG. 2*b* shows a second embodiment of an activation signal.

FIG. 2*c* shows a third embodiment of an activation signal.

FIG. 3 shows a flow chart for operation of a controller of a second terminal.

FIG. 5 shows a flow chart for operation of a controller of a master station.

DETAILED DESCRIPTION

Figure 1:
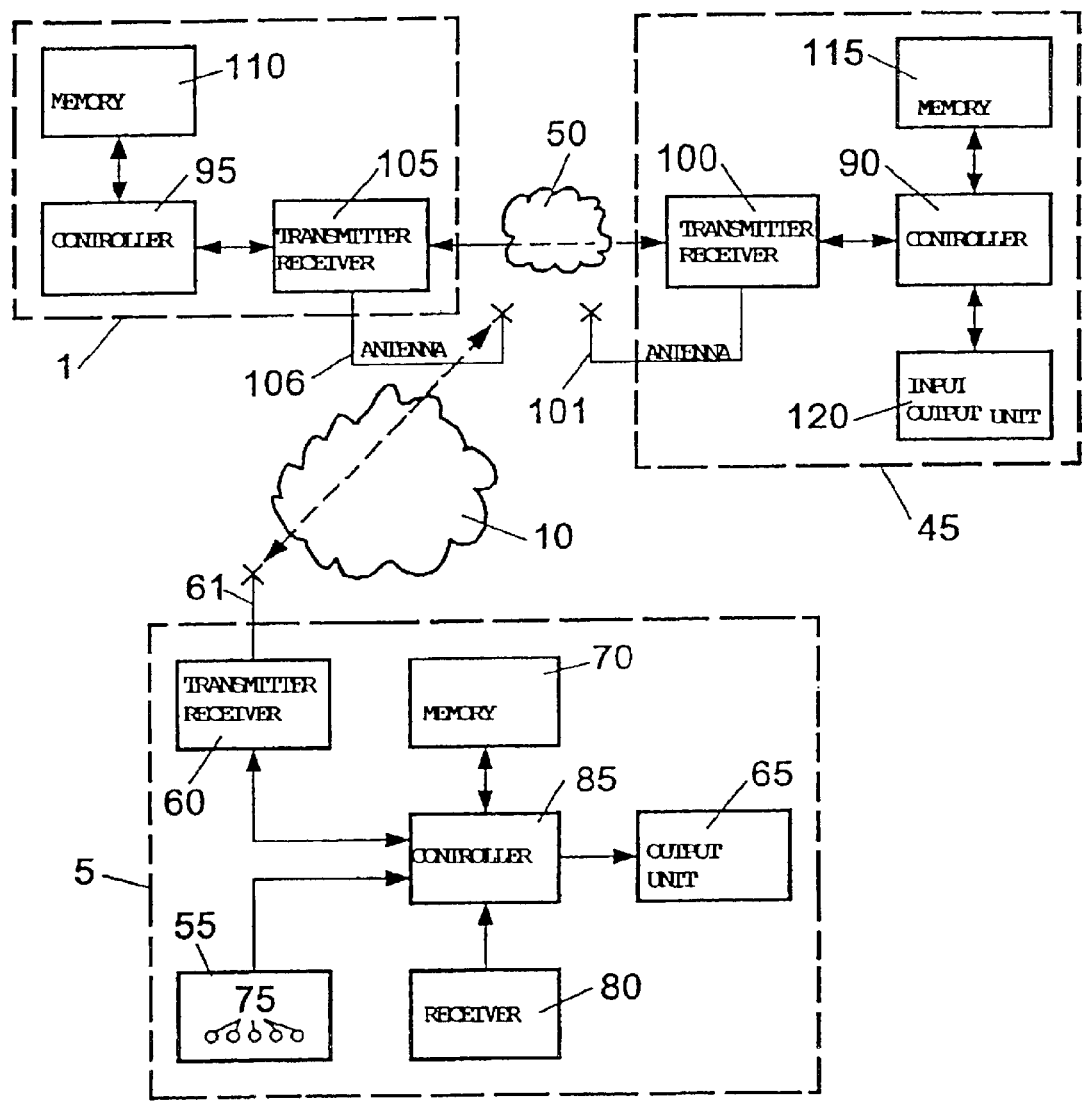
FIG. 1 shows a block diagram of a master station, a first terminal, and a second terminal.

FIG. 1 shows a master station 1 that can be run by a service provider. Master station 1 includes a controller 95 connected to a memory 110 and a transmitting/receiving device 105. A transmitting/receiving antenna 106 is connected to transmitting/receiving device 105. Master station 1 can additionally be connected to further service providers or data providers.

FIG. 1 shows a first terminal designed, for example, as a car radio with integrated radiotelephone. However, first terminal 5 can also be designed, for example, as a mobile radio unit, a cellular telephone, a cordless telephone, a private business radio, a two-way portable radio, a notebook with radio module, or the like. A design as a wire-bound telephone terminal is also possible. First terminal 5 includes a controller 85 connected to a control unit 55 including keys 75, a transmitting/receiving device 60, an output unit 65, a memory 70, and a receiver 80 for positioning data designed, for example, as GPS receiver (Global Positioning System). Control unit 55 can also include a voice input in lieu of or in addition to keys 75. Moreover, transmitting/receiving device 60 of first terminal 5 is connected to a transmitting/receiving antenna 61. Data exchange between master station 1 and first terminal 5 is possible over a first data network 10, which can be designed, for example, as radiotelephone network, so that data can be exchanged between master station 1 and first terminal 5 via transmitting/receiving antenna 61 of first terminal 5 and transmitting/receiving antenna 106 of master station 1. However, first data network 10 can also be a conventional wire-bound telephone network or an arbitrary data network.

FIG. 1 shows a second terminal 45, which is designed, for example, as personal computer, but which can also be designed as a laptop, a special-feature telephone, or the like. Second terminal 45 includes a controller 90 connected to a transmitting/receiving device 100, a memory 115 and an input/output unit 120. In addition, transmitting/receiving device 100 of second terminal 45 can be connected to a transmitting/receiving antenna 101. Data exchange between transmitting/receiving device 105 of master station 1 and transmitting/receiving device 100 of second terminal 5 is possible over a second data network 50, which can also be designed as a radiotelephone network, a wire-bound telephone network, or an arbitrary data network. In the case that second data network 50 is designed as a radiotelephone network, data can be exchanged between master station 1 and second terminal 45 via transmitting/receiving antenna 106 of master station 1 and transmitting/receiving antenna 101 of second terminal 45. In the exemplary embodiment according to FIG. 1, however, second data network 50 is designed as a wire-bound telephone network, to which both transmitting/receiving device 105 of master station 1 and transmitting/receiving device 100 of second terminal 45 are connected. Provision can also be made for the data exchange between master station 1 and first terminal 5 and for the data exchange between second terminal 45 and master station 1 to be implemented over only one data network.

Memory 70 of first terminal 5, memory 110 of master station 1, and memory 115 of second terminal 45 can be designed as non-volatile read-write memories. For controller 85 of first terminal 5, controller 90 of second terminal 45, and controller 95 of master station 1, in each case one microprocessor can be used. Output unit 65 of first terminal 5 and input/output unit 120 of second terminal 45 can each include one indicating device designed as a display and/or at least one loudspeaker for acoustically reproducing data. In the selected exemplary embodiment according to FIG. 1, control unit 55 of first terminal 5 includes five keys 75 and, possibly, further operating control elements such as a an alphanumeric ten-key pad and/or cursor keys.

Portable and mobile terminals frequently have limited input possibilities. Moreover, low data transmission rates exist and/or the communication times are very expensive. Nevertheless, the intention is for such terminals to be able to use services offered by master station 1. The configuring or the starting of, above all, complex services frequently requires user-dependent parameters such as, for example, user preferences to be inputted. Besides a terminal having limited input possibilities, many users have a further terminal having a better input possibility, for example, a personal computer. Nevertheless, the intention is for possibly complex user-configured services to be activated by a terminal that is limited in its input possibility. In this context, the further terminal having a better input possibility can be utilized by the user for configuring such a service.

In the exemplary embodiment according to FIG. 1, first terminal 5 represents a terminal that has limited input possibility. On the other hand, second terminal 45, which, according to the exemplary embodiment, can be designed as personal computer, represents a further terminal that has better input possibility. Thus, the activation of user-configured services is intended to be carried out at first terminal 5 that has limited input possibility. For such an activation, provision is made for a service identification 15 to be inputted at first terminal 5, whereas the configuration of a service is carried out with the aid of second terminal 45, which, at input/output unit 120, has the required input possibilities. On the other hand, control unit 55 of first terminal 55, has only limited input possibility.

FIG. 3 shows a flow chart for the function of controller 90 of second terminal 45. At a program point 200, controller 90 of second terminal 45, via transmitting/receiving unit 100 of second terminal 45, requests a connection to be established to transmitting/receiving unit 105 of master station 1 over second data network 50, which is designed, for example, as an ISDN (Intergrated Services Digital Network) network. In the case of a successful connection set-up, control 90 of second terminal 45, in response to a command input at input/output unit 120 on the part of a user, causes transmitting/receiving unit 100 of second terminal 45 to send a service-configuration request signal to master station 1, by which an offer of available services and appertaining service options is requested from master station 1.

At program point 205, it is checked whether an acknowledgment signal including the requested offer of services and the appertaining service options has been received from master station 1 in transmitting/receiving unit 100 of second terminal 45 within a predefined time. If this is the case, the program branches to point 215, otherwise the program branches to point 210.

At program point 210, control 90 of second terminal 45 causes transmitting/receiving unit 100 of second terminal 45 to disconnected from master station 1. Subsequently, the program branches back to point 200. However, provision can also be made for the program section to be exited subsequent to program point 210.

At program point 215, the offer of services received from master station 1, including the appertaining service options, is displayed and/or acoustically reproduced at input/output unit 120. The user can select one of the services at input/output unit 120 and set the appertaining service options as desired by inputting parameters. Thus, for example, monitoring the traffic situation can be selected as a service, and a starting location and a destination can be inputted at input/output unit 120 as parameters. Furthermore, selection parameters can be set such as, for example, to provide how many kilometers ahead traffic announcements. Moreover, information on the output possibilities of first terminal 5 and/or on output modes can be inputted or entered by the user at input/output unit 120. The output modes are settable according to the preferences of the user. Thus, for example, voice can be selected for a message output at first terminal 5. Then, transmitting/receiving unit 100 of second terminal 45 sends the selection of the service and the setting of the service options to master station 1 in the form of a service-configuration signal containing service-configuration data. In the process, a terminal identifier 20 of first terminal 5 and/or a user identification 25 of the user are also sent to the master station 1 with the service-configuration data. In this context, terminal, identifier 20 and/or user identification 25 is to be inputted by the user at input/output unit 120, together with the selection of the service and the parameters for the service options. In the process, terminal identifier 20 identifies the type or the scope of functionality of first terminal 5, and user identification 25 identifies the user and, in this manner, provides a check of an access authorization of a user to one or a plurality of services offered by master station 1. It is possible for the user identification to correspond to the telephone number of first terminal 5 in cases where first terminal 5 is designed as a telephone, for example, in a car radio, a cellular telephone, a cordless telephone, or the like. In a further step, which is not shown in FIG. 3, an acknowledgment request signal from master station 1 can be received in transmitting/receiving unit 100 of second terminal 45. It is possible for the service selection and setting of the service options carried out by master station 1 as a function of the received service-configuration signal to be acknowledged by the user at input/output unit 120. In the case of the selected example of monitoring of the traffic situation, for example, a driving route suggested by master station 1 and, possibly, further alternative driving routes suggested by master station 1 can be confirmed by the user at input/output unit 120. Moreover, master station 1 could send a correction request signal to second terminal 45, the correction request signal causing the user to correct, at input/output unit 120, previously made incorrect inputs. In this manner, in the example of the selected service of monitoring the traffic situation, a new interrogation including suggestions regarding the possible destinations can be submitted to second terminal 45 by master station 1 in the case of orthographic mistakes or unclear destinations. Furthermore, provision can also be made for transmitting/receiving unit 100 of second terminal 45 to receive a billing signal from master station 1, the billing signal causing the user of second terminal 45 to initiate, via input/output unit 120, a payment process for a service of master station 1 used by first terminal 5, for example, in the form of a debit order, which is then transmitted to master station 1.

At program point 220, control 90 of second terminal 45 checks whether transmitting/receiving unit 100 of second terminal 45 has received an acknowledgment signal including a service identification 15 within a further predefined time. If this is the case, then the program branches to point 225, otherwise the program branches to point 210.

At program point 225, service identification 15 is outputted, i.e., displayed and/or acoustically reproduced at input/output unit 12 and, in addition, service identification 15 can be stored in memory 115 of second terminal 45. In this context, service identification 15 is allocated to the service in master station 1 configured by the user at second terminal 45 so that the service configured in this manner can be activated in master station 1 by service identification 15. By storing service identification 15 in memory 115 of second terminal 45, the user need not memorize service identification 15 allocated to the configured service but can have it displayed and/or acoustically reproduced at input/output unit 120, as required, by inputting a command at input/output unit 120. Subsequent to program point 225, the program section is exited.

Figure 4:
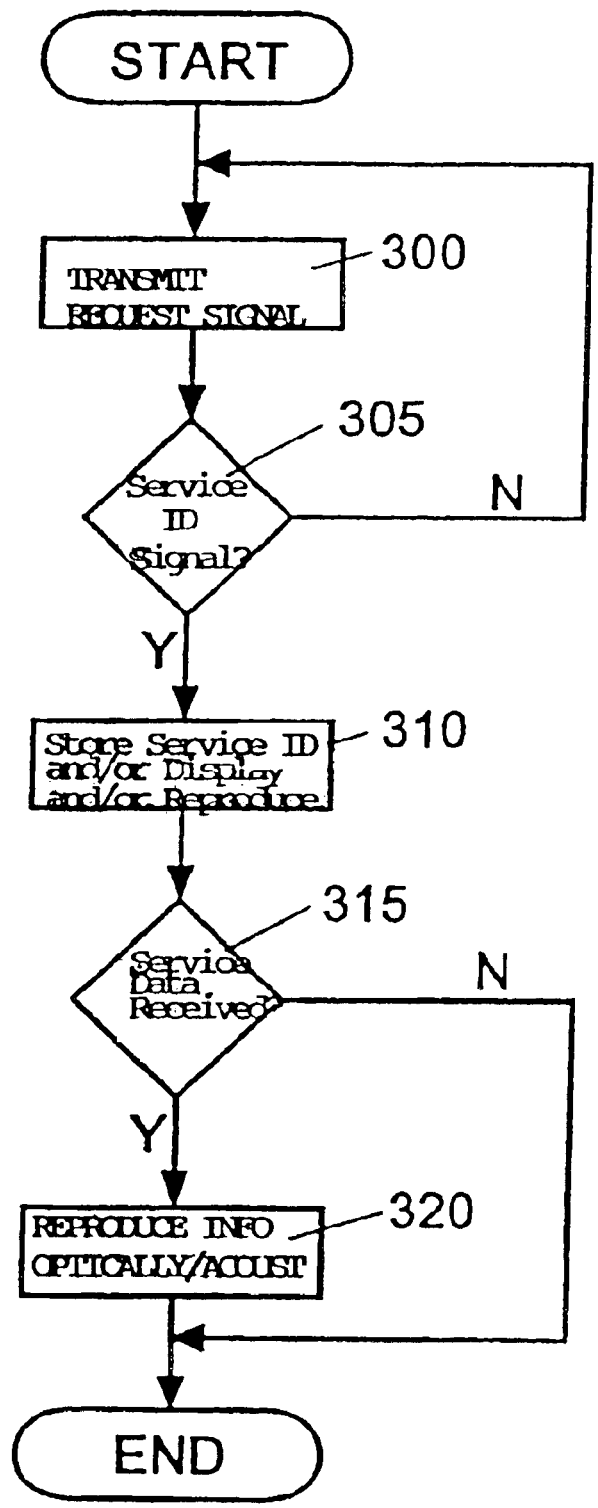
FIG. 4 shows a flow chart for operation of a controller of a first terminal.

FIG. 4 shows a flow chart for the function of controller 85 of first terminal 5. At a program point 300, controller 85 of first terminal 5 causes transmitting/receiving unit 60 of first terminal 5 to transmit a request signal to master station 1 over first data network 10 in response to an input of the user at control unit 55. In this context, first data network 10 can be designed as GSM network (Global System For Mobile Communications). With the request signal, in addition, terminal identifier 20 and/or user identification 25 can be transmitted to master station 1. It is possible for terminal identifier 20 and user identification 25 to reside in memory 70 of first terminal 5 and/or to be inputted at control unit 55, and routed to transmitting/receiving unit 60 of first terminal 5 by control 85 of first terminal 5 for emission to master station 1 with the assistance of the request signal.

At a program point 305, control 85 of first terminal 5 checks whether transmitting/receiving unit 60 of first terminal 5 has received a service-identification signal from master station 1 within a predefined time. The service-identification signal includes service identifications 15 of services of master station 1, which are usable by first terminal 5. If this is the case, then the program branches to point 310, otherwise the program branches back to point 300, or the program section is exited.

At program point 310, controller 85 of first terminal 5 can cause received service identifications 15 to be stored in memory 70 of first terminal 5. Furthermore, it is possible for controller 85 of first terminal 5 to cause service identifications 15 to be displayed and/or acoustically reproduced by output unit 65.

Independently of the previous program flow, the program can also be started at program point 310 in that the user inputs a service identification 15, for example, a codeword at control unit 55 in an operating mode of first terminal 5 using the ten-key pad. At program point 310, moreover, the user can input a command at control unit 55 for reproducing a selection menu at output unit 65, the selection menu offering service identifications 15 loaded from memory 70 of first terminal 5. At control unit 55, the user can then select a service identification 15 from the menu by a corresponding input, for example, using the cursor keys. The user can also allocate in each case one service identification 15 to keys 75. The service allocated to a key 75 is selected by actuating the corresponding key. Thereupon, control 85 of first terminal 5 causes transmitting/receiving unit 60 of first terminal 5 to send off an activation signal containing activation data 30 to master station 1. Activation data 30 includes selected service identification 15, terminal identifier 20, user identification 25 and, possibly, further additional data 35 according to FIG. 2a. According to FIG. 2b, service identification 15 and terminal identifier 20 can be combined into a shared identifier 40. According to FIG. 2c), service identification 15, terminal identifier 20, and user identification 25 can be combined into a shared identifier 40. Other arbitrary combinations of two identifiers into a shared identifier 40 are also possible. As already described, user identification 25 can correspond to the telephone number of first terminal 5; terminal identifier 20 can characterize the type and scope of functionality of first terminal 5; and shared identifier 40 can be, for example, a client number agreed with a service provider running master station 1. It is possible for the service provider to recognize in master station 1 by the client number transmitted by first terminal 5 which service configured by the user is to be activated, and which terminal the service is to deliver information to. In response to receiving activation data 30, master station 1 of the service provider, because of service identification 15, terminal identifier 20, and user identification 25, is activated to start the service selected by the user, which has possibly been configured previously in master station 1 using second terminal 45. By terminal identifier 20, master station 1 receives information on the terminal to which the service selected with the assistance of service identification 15 is to be transmitted, and which marginal conditions due to the type and the scope of functionality of this terminal must be considered in the process. With the assistance of user identification 25, the user identifies himself to the service provider in master station 1 that can check the authorization of the user in this manner.

At program point 315, it is checked whether service data has been received in transmitting/receiving unit 60 of first terminal 5 from master station 1 over first data network 10 within a further predefined time. If this is the case, then the program branches to point 320, otherwise the program section is exited.

At program point 320, controller 85 of first terminal 5 causes the information transmitted with the service data by master station 1 to be reproduced optically and/or acoustically at output unit 65. Possibly, controller 85 of first terminal 5 causes the information transmitted with the service data to be stored in memory 70 of first terminal 5. Subsequently, the program section is exited.

With the assistance of activation data 30, it is possible for additional data 35, according to FIG. 2a), FIG. 2b, and FIG. 2c), on a current condition and/or location of first terminal 5 to be transmitted to master station 1. During the generation of the service data in master station 1, additional data 35 can then be provided for so that the condition and/or location of first terminal 5 can be provided for during the implementation of the selected service at first terminal 5. In this manner, data varying in time of first terminal 5 can be provided for during the activation of the desired service. In the selected example of the service of monitoring the traffic situation, this can be implemented in that receiver 80 designed, for example, as GPS receiver (Global Positioning System) for positioning data ascertains the current position of first terminal 5 on the basis of received position signals, and position data derived from the position signals are transmitted to master station 1 with the assistance of additional data 35. In this context, the position data characterizes the current position of first terminal 5. In this manner, conditions and/or locations varying in time of first terminal 5 can be provided for during the activation of the desired service so that, in the selected example, the distance already driven is no longer considered during the monitoring of the traffic situation. First terminal 5 is carried, for example, in a vehicle.

Thus, a part of the data needed for configuring a service can also be generated automatically and transmitted to master station 1 by first terminal 5 with the assistance of additional data 35.

FIG. 5 shows a flow chart for the function of controller 95 of master station 1. At a program point 400, controller 95 of master station 1 checks whether a service-configuration request signal has been received by transmitting/receiving device 105 of master station 1 within a predefined time. If this is the case, then the program branches to point 405, otherwise the program branches to point 420.

At program point 405, a selection of the services offered by master station 1 and appertaining service options are transmitted to the sender of the service-configuration request signal, in the described example, second terminal 45.

At a program point 410, control 95 of master station 1 checks whether transmitting/receiving unit 105 of master station 1 has received a service-configuration signal within a further predefined time. If this is the case, then the program branches to point 460, otherwise the program section is exited.

At program point 460, control 95 of master station 1, with the assistance of user identification 25 transmitted with the service-configuration signal checks whether user identification 25 corresponds to user data stored in memory 110 of master station 1. If this is the case, then the program branches to point 465, otherwise the program section is exited. Thus, by checking user identification 25, the authorization of the user can be checked in master station 1 of the service provider. In the case that no user authorization exists, then the data exchange between master station 1 and second terminal 45 is terminated.

At program point 465, control 95 of master station 1 causes the service configured by the user, in this example, at second terminal 45 to be stored in memory 110 of master station 1, in which the service options or parameters transmitted with the service-configuration signal, terminal identifier 20 and/or user identification 25 are also stored in a manner that they are allocated to the selected service. Controller 95 of master station 1 allocates a service identification 15 to this service, and also stores the service identification in memory 110 of master station 1 in a manner that it is allocated to the selected service. For storing the service options and parameters selected by the user, service data containing these service options and parameters are derived from the service-configuration data received from transmitting/receiving unit 105 of master station 1. During the derivation of the service data from the service-configuration data, allowance is also made for information contained in the service-configuration data on output possibilities of first terminal 5 and/or output modes selected at second terminal 45. Then, the service options and the parameters, and possibly the output possibilities and/or modes are stored in memory 110 of master station 1 in the form of the service data. Subsequently, service identification 15 allocated to the selected service by control 95 of master station 1 is sent off to second terminal 45 by transmitting/receiving unit 105 of master station 1. Subsequent to program point 465, the program section is exited.

At program point 420, control 95 of master station 1 checks whether transmitting/receiving unit 105 of master station 1 has received a request signal within a further predefined time. If this is the case, the program branches to point 430, otherwise the program branches to point 440.

At program point 430, controller 95 of master station 1 checks whether a user identification 25 transmitted with the request signal corresponds to user data stored in memory 110 of master station 1. If this is the case, then the program branches to point 435, otherwise the program section is exited.

At program point 435, controller 95 of master station 1 causes transmitting/receiving unit 105 of master station 1 to transmit, over first data network 10, a service-identification signal to first terminal 5 sending the request signal, the service-identification signal including service identifications 15 of services of master station 1 that are usable by first terminal 5. An evaluation as to which services offered by master station 1 are usable by first terminal 5 is carried out by controller 95 of master station 1 on the basis of terminal identifier 20 of first terminal 5, which is also transmitted to master station 1 with the request signal, provided that this terminal identifier 20 has been transmitted to master station 1 with the request signal. Otherwise, the service-identification signal sent by master station 1 to first terminal 5 will contain service identifications 15 of all or a selection of the services offered by master station 1. In any case, by evaluating terminal identifier 20, controller 95 of master station 1 is in the condition to offer first terminal 5, with the assistance of the service-identification signal, only the services, via the allocated service identifications 15, which are actually usable as a function of the type and the scope of functionality of first terminal 5 identified by terminal identifier 20. Subsequent of program point 435, the program section is exited.

At program point 440, it is checked whether activation data 30 has been received within a further predefined time. If this is the case, then the program branches to point 450, otherwise the program section is exited.

At program point 450, it is checked whether user identification 25 of first terminal 5 transmitted to master station 1 with activation data 30 corresponds to user data stored in memory 110 of master station 1. If this is the case, then the program branches to point 455, otherwise the program section is exited.

At program point 455, controller 95 of master station 1 selects a service which, in memory 110 of master station 1, is allocated to service identification 15 transmitted with activation data 30. The corresponding service data, as a function of terminal identifier 20 transmitted with activation data 30, is called and adapted to the type and scope of functionality of first terminal 5 in such a manner that the service data is recognized by first terminal 5 upon reception and initiates functions for implementing the selected service at first terminal 5. In case additional data 35 has been received in transmitting/receiving unit 105 of master station 1 with activation data 30, controller 95 of master station 1 can additionally condition the service data with the aid of additional data 35 so that the condition and/or location of first terminal 5 is allowed for during the implementation of the selected service. Controller 95 of master station 1 then causes transmitting/receiving unit 105 of master station 1 to transmit the service data conditioned in this manner to first terminal 5 over first data network 10. Subsequently, the program section is exited.

A plurality of advantageous further developments of the method and device according to the present invention are possible. Service identification 15 can be stored in memory 70 of first terminal 5 for a repeated use of the allocated service. Furthermore, provision can be made for the user to input a text at control unit 55 via, for example, an alphanumeric keyboard for explaining service identification 15, and to cause the text to be stored in memory 70 of first terminal 5 by inputting a command at control unit 55. In the case of a repeated use of the user-configured service, the text is useful for allocating this service to the appertaining service identification 15 since the user associates the appertaining service more easily by the text than is the case with a service identification 15 formed as a codeword or code number. Texts for explaining allocated service identifications 15 can also be transmitted to first terminal 5 by master station 1 with the service-identification signal in response to the request signal of first terminal 5. Subsequently, the texts can then be stored in memory 70 of first terminal 5. When selecting a service, which has previously been configured in master station 1 by second terminal 45, the texts can then be represented at output unit 65 of first terminal 5, for example, with the aid of a menu representation so that the user is able to select such a service at control unit 55 in a particularly simple and time-saving manner, which then results in the transmission of service identification 15 of the selected service appertaining to the text to master station 1 by corresponding activation data 30. It is also possible to directly transmit the appertaining text to master station 1 in lieu of service identification 15. Then, the texts allocated correspondingly to the individual services configured via second terminal 45 are also to be stored in memory 110 of master station 1 and to be compared by control 95 of master station 1 to the text transmitted to master station 1 by first terminal 5 so that the service selected at first terminal 5 is thus ascertained in master station 1, and the appertaining service data can be called from memory 110 of master station 1 for a transmission to first terminal 5. Consequently, the input of a service identification 15 at control unit 55 can be dispensed with for the user of first terminal 5 so that he must only input the text allocated to the selected service at control unit 55, or select the text with the aid of the menu representation at output unit 65. In place of or in addition to a list including keyword-like descriptions of the user-configured services by texts, these services can be allocated to keys 75 of first terminal 5, of which five are shown in FIG. 1, and which can be designed, for example, as preset station buttons of a car radio, in particular with integrated telephone. The storage of specific services to keys 75 makes the selection of, very frequently used services easier for the user.

During the configuration of a service by second terminal 45, it is also advantageous for the service to be able to be configured over a second data network 50 independently of first data network 10. An inexpensive data network is selectable for second data network 50, so that costs during the configuration of the service in master station 1 can be reduced, particularly when the communication over first data network 10, and therewith a configuration of a service in master station 1 by first terminal 5 is more expensive.

In a further embodiment, the functionality of second terminal 45 can additionally or alternatively be integrated in master station 1, as well, so that services can also be configured without using a data network for exchanging data between second terminal 45 and master station 1. In this context, the service-configuration data including parameters for selecting a service which is usable by first terminal 5 and offered by master station 1, can be input directly at master station 1 using terminal identifier 20 and/or user identification 25 of first terminal 5. Then, service data is derived from the service-configuration data in master station 1 and stored in master station 1 with terminal identifier 20 and/or user identification 25. A service identification 15 is allocated to the service data and stored with the service data in master station 1. In this embodiment, master station 1 includes the functionality of a terminal and, consequently, represents a terminal having enhanced functionality.

What is claimed is:

1. A method for a first terminal to use services offered by a master station, comprising the steps of:
transmitting activation data from the first terminal to the master station over a first data network;
transmitting a service identification and a terminal identifier to the master station using the activation data, the terminal identifier indicating a type and a functionality of the first terminal;
selecting a service in the master station as a function of the service identification; and
transmitting service data corresponding to the selected service from the master station to the first terminal over the first data network as a function of the terminal identifier, the service data being recognized by the first terminal upon reception and initiating functions for implementing the selected service at the first terminal.

2. The method according to claim 1, further comprising the steps of:
transmitting a user identification to the master station using the activation data; and
from the master station, transmitting the service data to the first terminal only if the user identification corresponds to user data stored in the master station.

3. The method according to claim 1, further comprising the steps of:
from the first terminal, transmitting a request signal to the master station over the first data network, the request signal including at least one of the terminal identifier and a user identification; and
from the master station, transmitting a service-identification signal to the first terminal over the first data network as a function of the received request signal, the service-identification signal including service identifications of services of the master station that are usable by the first terminal.

4. The method according to claim 1, further comprising the steps of:
transmitting additional data to the master station using the activation data, the additional data including at least one of condition of the first terminal and location of the first terminal; and
using the master station, generating the service data as a function of the additional data so that at least one of the condition of the first terminal and the location of the first terminal are provided for during implementation of the service.

5. The method according to claim 1, further comprising the step of:
combining at least one of the service identification, the terminal identifier, and a user identification into a single shared identifier.

6. The method according to claim 1, further comprising the steps of:
inputting service-configuration data at the master station, the service-configuration data including parameters for selecting a service usable by the first terminal and offered by the master station;
inputting at least one of the terminal identifier and a user identification of the first terminal along with the service-configuration data at the master station;
deriving the service data from the service-configuration data and storing the service data in the master station with at least one of the terminal identifier and the user identification; and allocating a service identification to the service data and storing the service identification with the service data in the master station.

7. The method according to claim 1, further comprising the steps of:

from a second terminal, transmitting service-configuration data to the master station over a second data network, the service-configuration data including parameters for selecting a service usable by the first terminal and offered by the master station;

transmitting at least one of the terminal identifier and a user identification along with the service-configuration data to the master station;

deriving the service data from the service-configuration data and storing the service data with at least one of the terminal identifier and the user identification in the master station; and allocating a service identification to the service data, storing the service identification with the service data in the master station and transmitting the service identification to the second terminal over the second data network.

8. The method according to claim 7, further comprising the step of:

transmitting information with the service-configuration data, the information including at least one of output possibilities of the first terminal and predefinable output modes.

9. The method according to claim 7, wherein:

the first data network and the second data network include a common data network.

10. The method according to claim 7, further comprising the step of:

monitoring at the first terminal a traffic situation from a current location of the first terminal to a destination of the first terminal as a function of a second destination selected at the second terminal and transmitted with the service-configuration data to a master station and as a function of the current location of the first terminal transmitted with additional data to the master station by the first terminal.

11. A terminal comprising:

a control unit, a service identification being inputtable at the control unit during an operating mode; and a transmitter/receiver device for transmitting and receiving data over a data network, the transmitter/receiver device transmitting activation data to a master station for selecting a service allocated to the service identification after the service identification is inputted to the control unit, the activation data including the service identification and a terminal identifier, the terminal identifier identifying the terminal and indicating a type and a functionality of the terminal.

12. The terminal according to claim 11, wherein:

the terminal is one of a telephone terminal and a mobile radio unit.

13. The terminal according to claim 11, wherein:

the service identification is inputtable via a ten-key pad.

14. The terminal according to claim 11, wherein:

the transmitter/receiver device transmits a user identification with the activation data to the master station for checking authorization for using a selected service.

15. The terminal according to claim 11, further comprising:

an output unit, a selected service being outputted at the output unit after the transmitter/receiver device receives a service signal.

16. The terminal according to claim 11, further comprising:

memory, at least one service identification being stored in the memory.

17. The terminal according to claim 11, wherein:

at least one text is inputtable at the control unit;

the at least one text is allocatable to a service identification; and the at least one text is storable in memory and outputted at an output unit after selection of the operating mode.

18. The terminal according to claim 17, wherein:

the at least one text is inputtable via an alphanumeric keyboard.

19. The terminal according to claim 17, wherein:

the at least one text stored in the memory is outputable at the output unit during the operating mode;

one of the at least one text is selectable at the control unit; and subsequent to a selection of a text, the transmitter/receiver device transmits activation data including a service identification allocated to the selected text.

20. The terminal according to claim 11, wherein:

a request command is inputtable at the control unit;

after the request command has been inputted, the transmitter/receiver device transmits a request signal to the master station for requesting services available via the master station for the terminal, the request signal including the terminal identifier.

21. The terminal according to claim 11, wherein:

after the transmitter/receiver device receives a service-identification signal, service identifications derived from the service-identification signal are at least one of outputted at an output unit and stored in memory.

22. The terminal according to claim 21, wherein:

the service identifications are text.

23. The terminal according to claim 21, wherein:

the service identifications stored in the memory are outputable at the output unit and selectable via the control unit; and after selection of a service identification, the transmitter/receiver device transmits activation data including the selected service identification.

24. The terminal according to claim 11, wherein:

the control unit includes at least one key, a service identification being allocatable to the at least one key;

after actuation of the at least one key, the transmitter/receiver device transmits activation data including an allocated service identification.

25. The terminal according to claim 11, wherein:

the transmitter/receiver device transmits additional data with the activation data, the additional data being generated as a function of at least one of a current condition of the terminal and location of the terminal.

26. The terminal according to claim 25, further comprising:

a receiver for receiving position signals, wherein:

the additional data includes position data derived from the position signals received by the receiver, the position data including the location of the terminal.

27. The terminal according to claim 26, wherein:

the receiver is a Global Positioning System receiver.

* * * * *

UNITED STATES PATENT AND TRADEMARK OFFICE
CERTIFICATE OF CORRECTION

PATENT NO. : 6,823,354 B1
DATED : November 23, 2004
INVENTOR(S) : Andreas Kynast et al.

It is certified that error appears in the above-identified patent and that said Letters Patent is hereby corrected as shown below:

Column 4,
Line 21, change "a first terminal designed," to -- a first terminal 5 designed, --

Column 8,
Lines 47-48, change "FIG 2*a*), FIG 2*b* and FIG 2*c*)," to -- FIG. 2*a*, FIG. 2*b* and FIG 2*c*, --

Signed and Sealed this

Twenty-eighth Day of June, 2005

JON W. DUDAS
*Director of the United States Patent and Trademark Office*